United States Patent
Yi

(10) Patent No.: US 10,834,751 B2
(45) Date of Patent: Nov. 10, 2020

(54) METHOD AND APPARATUS FOR DELIVERING TIME-CRITICAL MESSAGE BETWEEN DEVICES BELONGING TO DIFFERENT CELLS IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 285 days.

(21) Appl. No.: 15/750,748

(22) PCT Filed: Aug. 16, 2016

(86) PCT No.: PCT/KR2016/008968
§ 371 (c)(1),
(2) Date: Feb. 6, 2018

(87) PCT Pub. No.: WO2017/030338
PCT Pub. Date: Feb. 23, 2017

(65) Prior Publication Data
US 2020/0092907 A1    Mar. 19, 2020

Related U.S. Application Data

(60) Provisional application No. 62/205,005, filed on Aug. 14, 2015.

(51) Int. Cl.
*H04W 72/14* (2009.01)
*H04W 4/44* (2018.01)
*H04W 4/40* (2018.01)
*H04W 28/02* (2009.01)
*H04W 72/04* (2009.01)

(52) U.S. Cl.
CPC ............ *H04W 72/14* (2013.01); *H04W 4/40* (2018.02); *H04W 28/02* (2013.01); *H04W 72/0446* (2013.01)

(58) Field of Classification Search
CPC ... H04W 5/40; H04W 28/02; H04W 72/0446; H04W 72/14
See application file for complete search history.

(56) References Cited

U.S. PATENT DOCUMENTS

| 2011/0080302 A1 | 4/2011 | Muthaiah et al. |
| 2012/0038489 A1 | 2/2012 | Goldshmidt |
| 2014/0051346 A1 | 2/2014 | Li et al. |
| 2014/0354451 A1* | 12/2014 | Tonguz ............ G08G 1/096716 340/905 |

(Continued)

OTHER PUBLICATIONS

LG Electronics Inc., "Motivation of Feasibility Study on LTE-based V2X Services," RP-150164, 3GPP TSG RAN-67, Mar. 3, 2015, see pp. 3-7.

*Primary Examiner* — Brian P Cox
(74) *Attorney, Agent, or Firm* — Dentons US LLP

(57) ABSTRACT

A method and apparatus for transmitting a time-critical message in a wireless communication system is provided. A user equipment (UE) (e.g. vehicle UE (V-UE)) receives a grant of resources in a resource pool for the time-critical message from a network (e.g. eNodeB (eNB)) or a road side unit (RSU) for vehicle-to-everything (V2X) communication), and transmits the time-critical message by using the granted resources to another UE. The time-critical message may correspond to V2X communication.

11 Claims, 12 Drawing Sheets

(56) References Cited

U.S. PATENT DOCUMENTS

| | | |
|---|---|---|
| 2015/0195827 A1 | 7/2015 | Feng et al. |
| 2016/0219541 A1* | 7/2016 | Chatterjee ............... H04W 4/90 |
| 2016/0302051 A1* | 10/2016 | Lindoff ................. H04W 76/14 |
| 2017/0079016 A1* | 3/2017 | Nord ..................... H04W 24/10 |
| 2018/0063825 A1* | 3/2018 | Van Phan ........... H04W 72/042 |

\* cited by examiner

FIG. 8
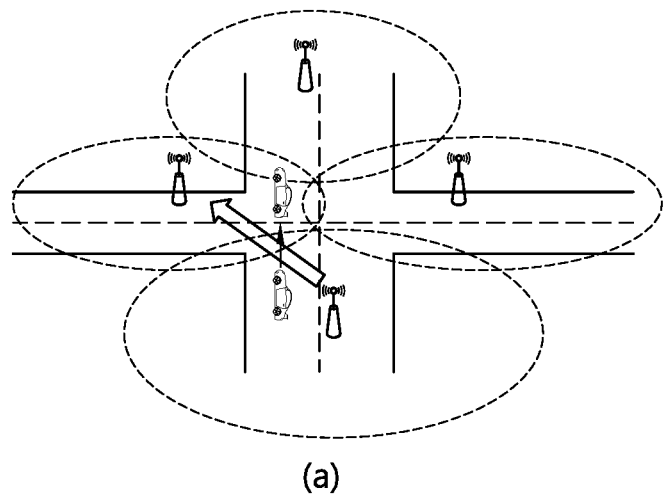
(a)
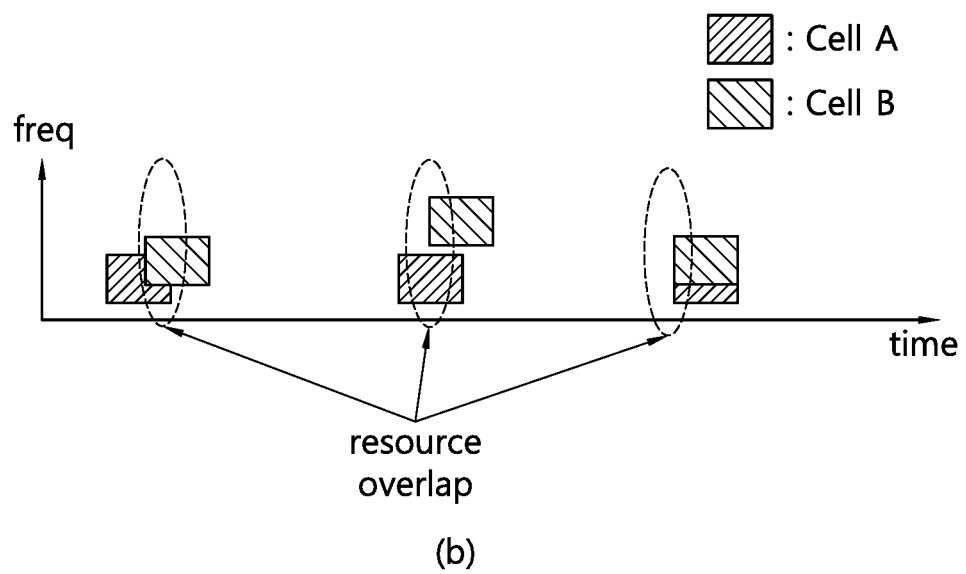
(b)

METHOD AND APPARATUS FOR DELIVERING TIME-CRITICAL MESSAGE BETWEEN DEVICES BELONGING TO DIFFERENT CELLS IN WIRELESS COMMUNICATION SYSTEM

CROSS-REFERENCE TO RELATED APPLICATIONS

This application is the National Stage filing under 35 U.S.C. 371 of International Application No. PCT/KR2016/008968, filed on Aug. 16, 2016, which claims the benefit of U.S. Provisional Application No. 62/205,005 filed on Aug. 14, 2015, the contents of which are all hereby incorporated by reference herein in their entirety.

BACKGROUND OF THE INVENTION

Field of the Invention

The present invention relates to wireless communications, and more particularly, to a method and apparatus for delivering a time-critical message between devices, which belong to different cells from each other, using device-to-device (D2D) technology in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

The pace of LTE network deployment is accelerating all over the world, which enables more and more advanced services and Internet applications making use of the inherent benefits of LTE, such as higher data rate, lower latency and enhanced coverage. Widely deployed LTE-based network provides the opportunity for the vehicle industry to realize the concept of 'connected cars'. By providing a vehicle with an access to the LTE network, a vehicle can be connected to the Internet and other vehicles so that a broad range of existing or new services can be envisaged. Vehicle manufacturers and cellular network operators show strong interests in vehicle wireless communications for proximity safety services as well as commercial applications. LTE-based vehicle-to-everything (V2X) study is urgently desired from market requirement, and the market for vehicle-to-vehicle (V2V) communication in particular is time sensitive. There are many research projects and field tests of connected vehicles in some countries or regions, such as US/Europe/Japan/Korea.

V2X includes a vehicle-to-vehicle (V2V), covering LTE-based communication between vehicles, vehicle-to-pedestrian (V2P), covering LTE-based communication between a vehicle and a device carried by an individual (e.g. handheld terminal carried by a pedestrian, cyclist, driver or passenger), and vehicle-to-infrastructure/network (V2I), covering LTE-based communication between a vehicle and a roadside unit (RSU)/network.

V2X communication may include a time-critical message to be delivered between devices. Accordingly, a method for delivering a time-critical message between devices may be required.

SUMMARY OF THE INVENTION

The present invention provides a method and apparatus for delivering a time-critical message between devices, which belong to different cells from each other, using device-to-device (D2D) technology in a wireless communication system. The present invention discusses mechanisms to provide direct communication among devices which are served or managed by different cells or operators. Furthermore, the present invention also discusses mechanisms to provide service continuity, particularly for time-critical, reliability-required messages.

In an aspect, a method for transmitting, by a user equipment (UE), a time-critical message in a wireless communication system is provided. The method includes receiving a grant of resources in a resource pool for the time-critical message from a network, and transmitting the time-critical message by using the granted resources to another UE.

In another aspect, a user equipment (UE) in a wireless communication system is provided. The UE includes a memory, a transceiver, and a processor, coupled to the memory and the transceiver, that controls the transceiver to receive a grant of resources in a resource pool for the time-critical message from a network, and controls the transceiver to transmit the time-critical message by using the granted resources to another UE.

Time-critical message or reliability-required message, specifically for vehicle-to-everything (V2X) communication, can be transmitted between devices efficiently.

BRIEF DESCRIPTION OF THE DRAWINGS

FIG. 8 shows an example of D2D operation between UEs belonging to different cells according to an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
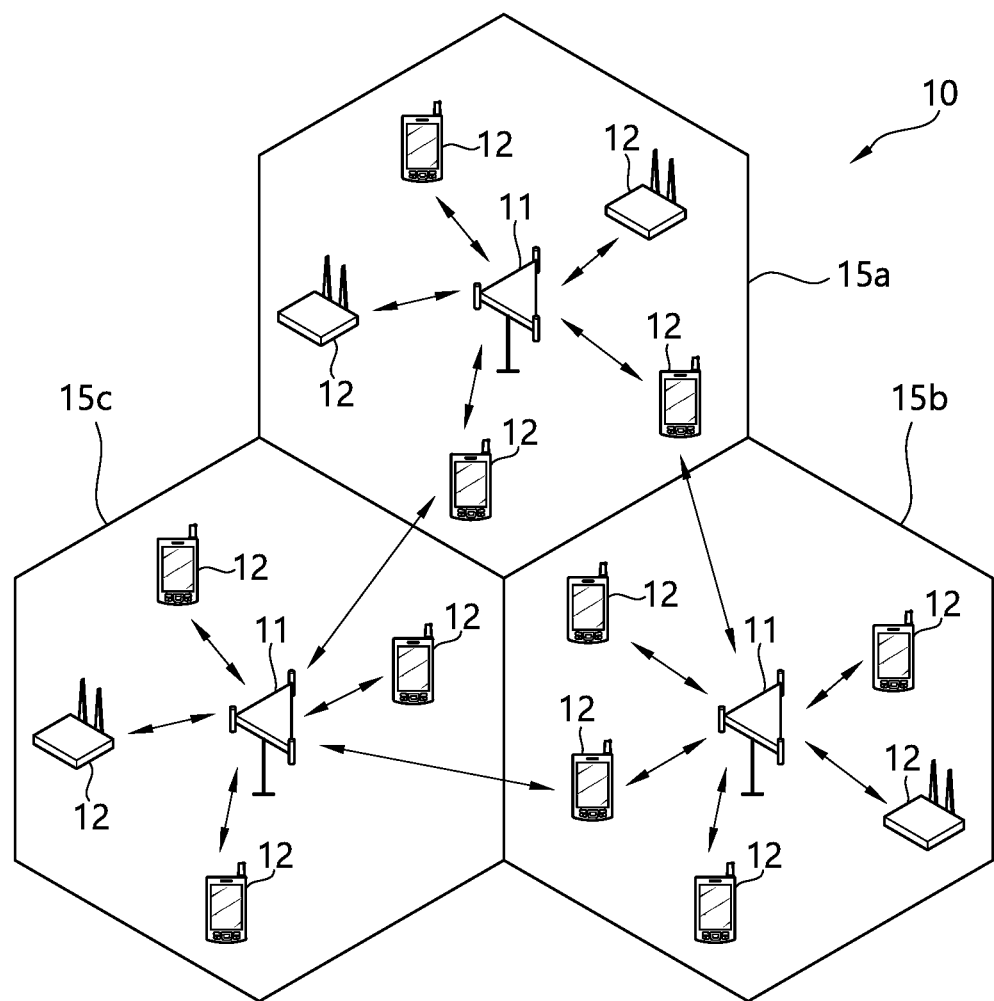
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

Figure 2:
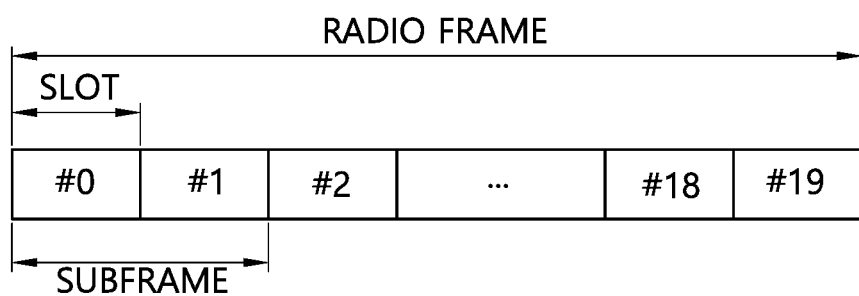
FIG. 2 shows structure of a radio frame of 3GPP LTE.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream. FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
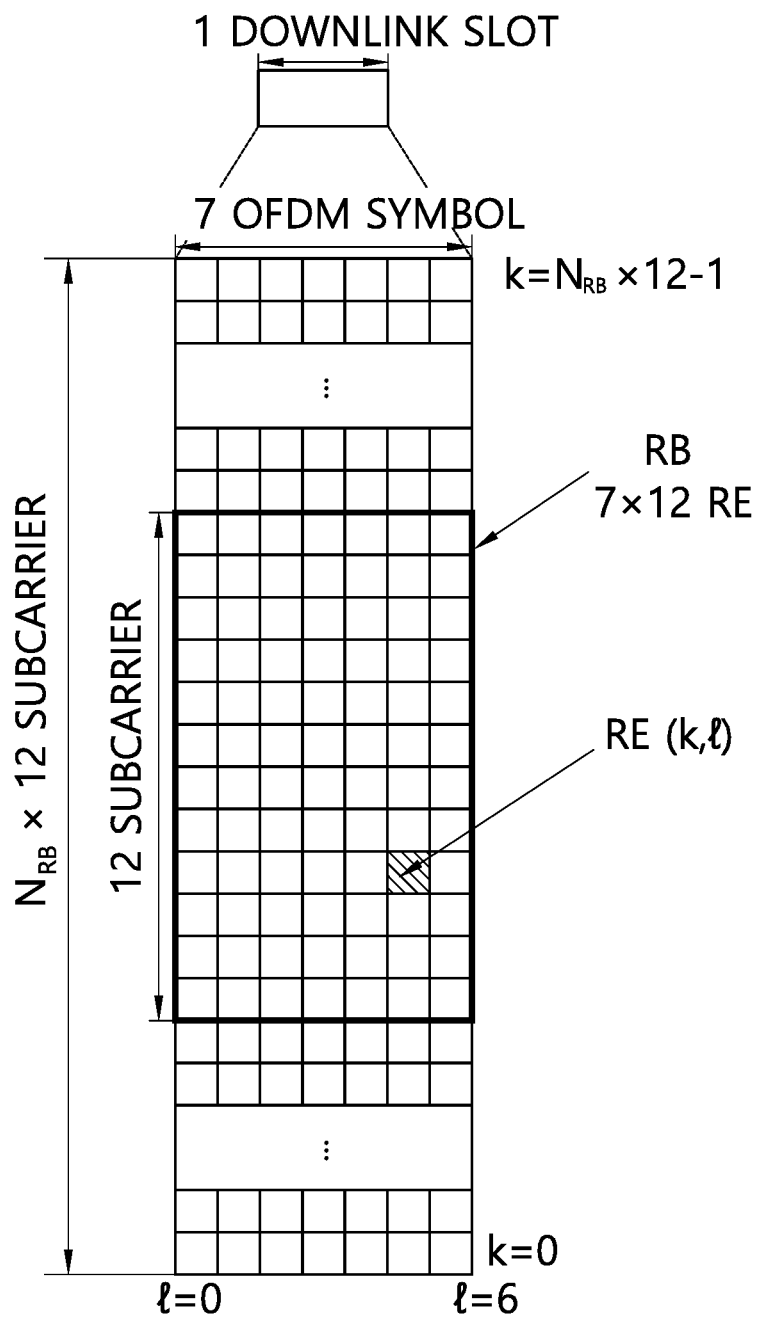
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
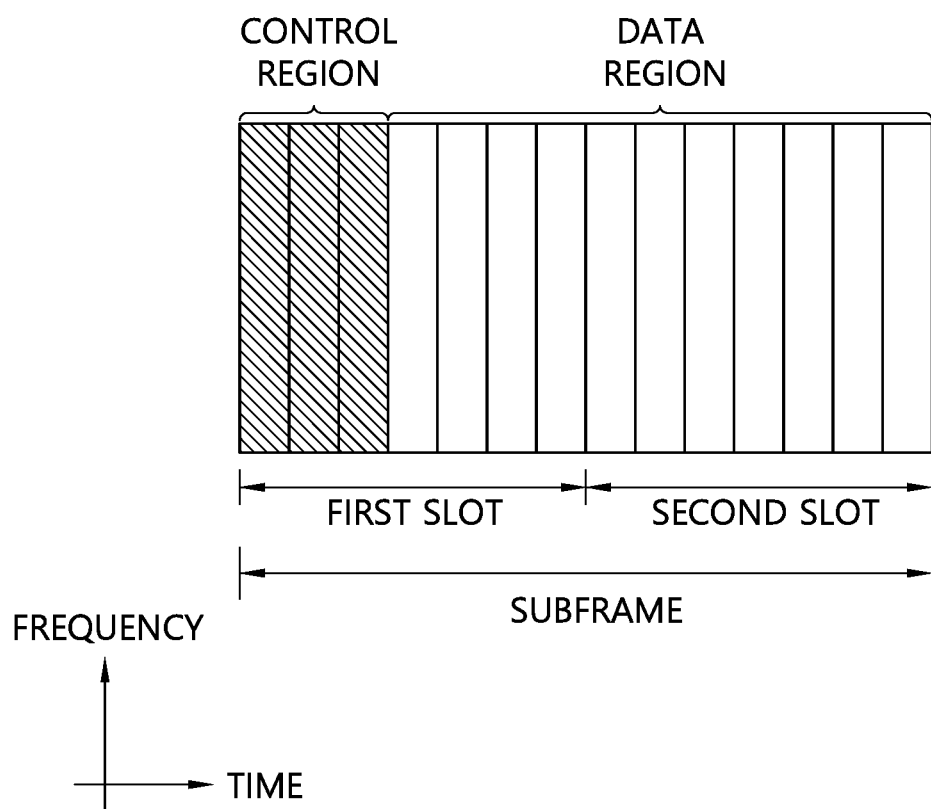
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
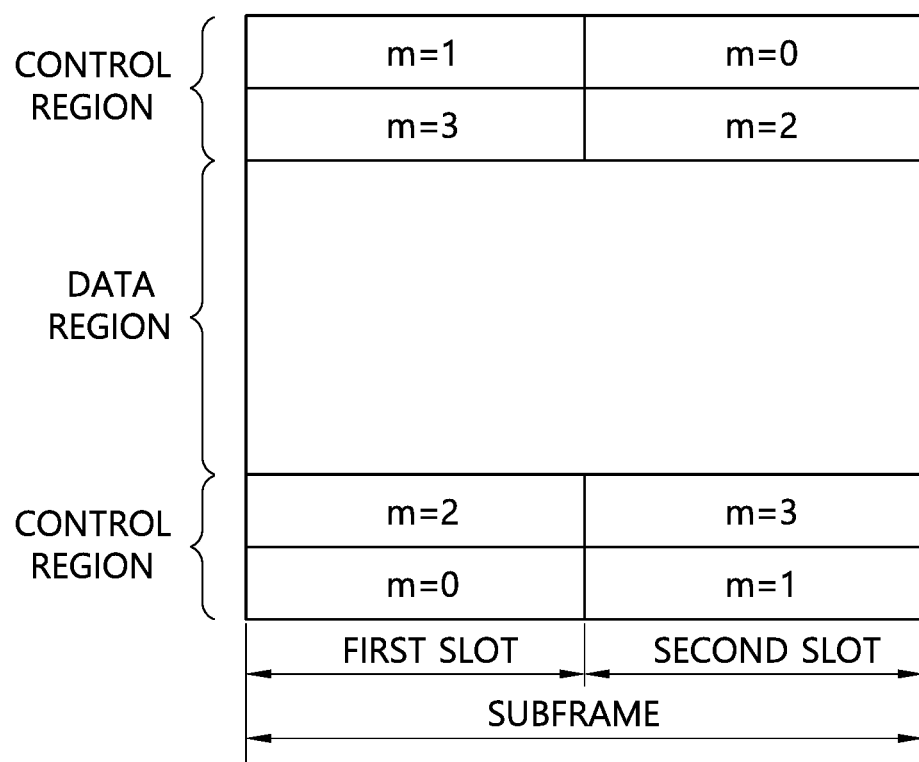
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Proximity-based services (ProSe) are described. "ProSe" may be used mixed with "D2D"(i.e. device-to-device). ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity ProSe UE identity (ID) is a unique identity allocated by evolved packet system (EPS) which identifies the ProSe enabled UE. ProSe application ID is an identity identifying application related information for the ProSe enabled UE.

UE performs ProSe direct communication on subframes defined over the duration of sidelink control period. The sidelink control period is the period over which resources allocated in a cell for sidelink control and sidelink data transmissions occur. Within the sidelink control period, the UE sends a sidelink control followed by data. Sidelink control indicates a layer 1 ID and characteristics of the transmissions (e.g. modulation and coding scheme (MCS), location of the resource(s) over the duration of sidelink control period, timing alignment).

For ProSe direct communication, the UE supporting ProSe direct communication can operate in two modes for resource allocation, which include Mode 1 (scheduled resource allocation) and Mode 2 (UE autonomous resource selection). In Mode 1, the UE needs to be RRC_CONNECTED in order to transmit data. The UE requests transmission resources from the eNB. The eNB schedules transmission resources for transmission of sidelink control and data. The UE sends a scheduling request (dedicated scheduling request (D-SR) or random access) to the eNB followed by a ProSe buffer status report (BSR). Based on the ProSe BSR, the eNB can determine that the UE has data for a ProSe direct communication transmission and estimate the resources needed for transmission. The eNB can schedule transmission resources for ProSe direct communication using configured sidelink radio network temporary identifier (SL-RNTI). In Mode 2, a UE on its own selects resources from resource pools to transmit sidelink control and data.

ProSe direct discovery is defined as the procedure used by the UE supporting direct discovery to discover other UE(s) in its proximity, using E-UTRA direct radio signals via PC5. ProSe direct discovery is supported only when the UE is served by E-UTRAN.

There are two types of resource allocation for discovery message announcement, which include Type 1 (UE autonomous resource selection) and Type 2 (scheduled resource allocation). Type 1 is a resource allocation procedure where resources for announcing of discovery message are allocated on a non UE specific basis. In Type 1, the eNB provides the UE(s) with the resource pool configuration used for announcing of discovery message. The configuration may be signaled in broadcast or dedicated signaling. The UE autonomously selects radio resource(s) from the indicated resource pool and announce discovery message. The UE can announce discovery message on a randomly selected discovery resource during each discovery period. Type 2 is a resource allocation procedure where resources for announcing of discovery message are allocated on per UE specific basis. In Type 2, the UE in RRC_CONNECTED may request resource(s) for announcing of discovery message from the eNB via radio resource control (RRC). The eNB assigns resource(s) via RRC. The resources are allocated within the resource pool that is configured in UEs for monitoring.

Vehicle-to-everything (V2X) communication is described. V2X communication contains three different types, which are vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, roadside infrastructure, and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X Service, where one party is a UE and the other party is a road side unit (RSU) both using V2I application. The RSU is an entity supporting V2I service that can transmit to, and receive from a UE using V2I application. RSU is implemented in an eNB or a stationary UE. RSU will be described below in detail. V2P service is a type of V2X service, where both parties of the communication are UEs using V2P application. V2N service is a type of V2X Service, where one party is a UE and the other party is a serving entity, both using V2N applications and communicating with each other via LTE network entities.

For V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X Service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X service, e.g., RSU, application server, etc.

For V2I, the UE supporting V2I applications sends application layer information to RSU. RSU sends application layer information to a group of UEs or a UE supporting V2I applications. V2N is also introduced where one party is a UE and the other party is a serving entity, both supporting V2N applications and communicating with each other via LTE network.

For V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X Service. The UE supporting V2P applications transmits application layer information. Such information can be broadcast by a vehicle with UE supporting V2X service (e.g., warning to pedestrian), and/or by a pedestrian with UE supporting V2X service (e.g., warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

The RSU is described. In V2X communication where each vehicle UE (hereinafter, V-UE) communicates with each other directly (i.e. V2V communication), quality of communication can be reduced due to resource collision of each V-UE, Doppler shift by fast speed of V-UE, etc. Or, direct communication between V-UEs may be difficult due to distance between V-UEs. In order to solve the problem describe above, an infrastructure equipment (IE) for V2X communication may be deployed in the neighborhood of V-UEs in order to support V2V communication. The IE for V2X communication may receive and store a message for V2V communication from one V-UE and forward the corresponding message to other V-UEs. By deploying the IE for V2X communication, issues for deterioration of communication quality and/or a case that direct communication between V-UEs are not possible can be solved.

Figure 6:
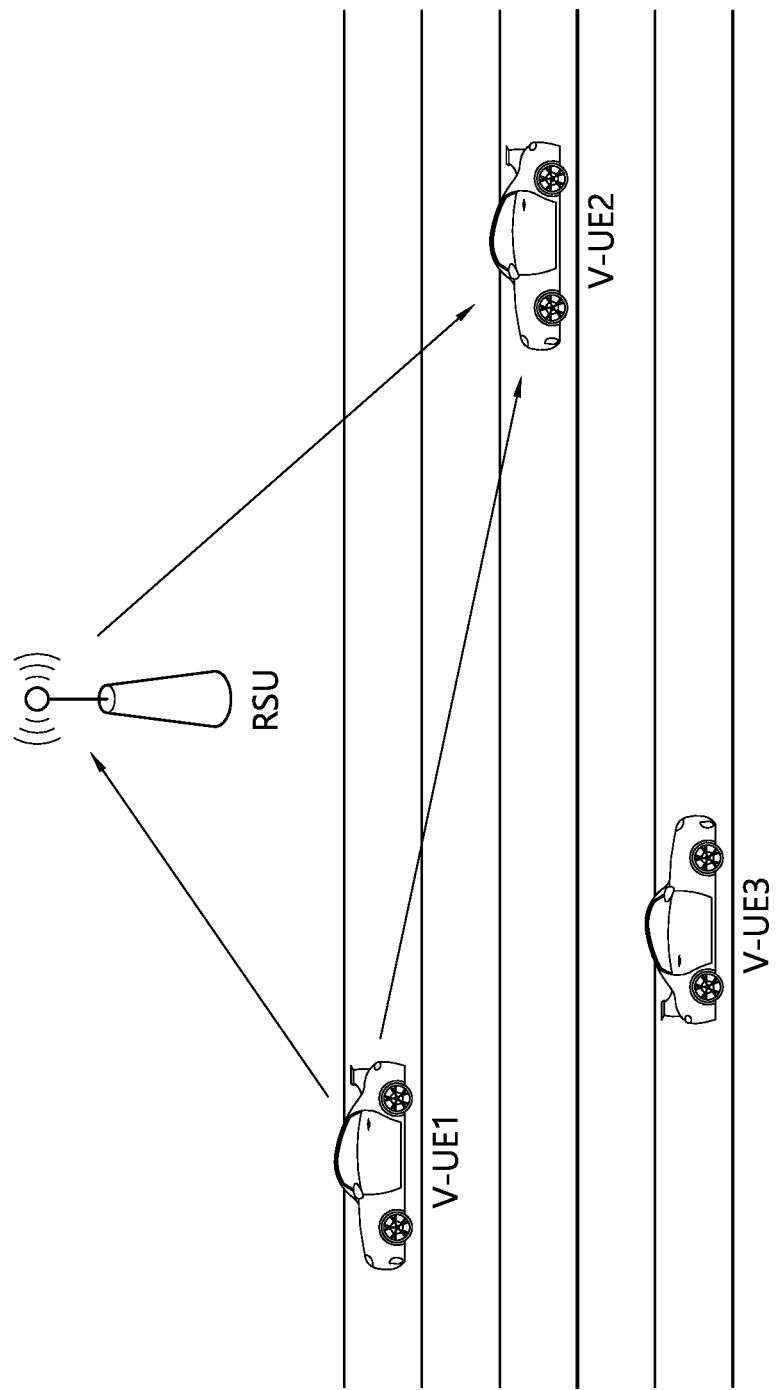
FIG. 6 shows an example of V2X communication via RSU.

FIG. 6 shows an example of V2X communication via RSU. Referring to FIG. 6, V-UE2 may receive a V2V message of V-UE1 from V-UE1 directly. Or, V-UE may a V2V message of V-UE1 from V-UE1 indirectly via the IE for V2X communication. The IE for V2X communication may be a network node corresponding to the existing cellular network, e.g. eNB, a new entity for V2X communication, a new gateway for V2X communication of the cellular network. Or, the IE for V2X communication may be a RSU which is deployed for V2I or I2V communication. In FIG. 6, the IE for V2X communication is the RSU. In some cases, the IE for V2X communication may be a specific V-UE or a cellular UE.

The RSU is an independent device which has a memory unit and can access to infrastructure. The RSU may be deployed in the road side, and may be fixed in the specific location. There may be two types of RSU, one of which is eNB-type RSU (hereinafter, RSU-E) which may provide service and schedule data without any assistance or association with any other eNB or cell. The other is UE-type RSU (hereinafter, RSU-U) which needs to be associated with a serving cell or a cell to be able to provide service. When the RSU-U is out-of-coverage, the RSU-U may provide service based on preconfigured resource and/or configuration. Unless noted otherwise, the present invention may be applied to both types of RSU.

The RSU may have at least one of the following functionalities.

(1) Repeat/relay operation between one or more V-UE(s) to other V-UE(s)

(2) Store some events and broadcast the stored events periodically or based on the request (3) Resource management, e.g. control the congested channel/resource (4) Dynamic adjustment or adaptation of resource D2D technology allows direct communication among UEs. For example, cars may exchange situation information, such as traffic load, accidents information, etc., periodically with each other to enhance the situation awareness. For example, in typical scenarios, two types of messages for V2V communication may be considered for such situation information, one of which is decentralized environmental notification message (DENM) and the other is cooperative awareness message (CAM). Depending on its purpose, some messages are time-critical and should be supported regardless of whether handover is performed. For example, DENM may need to be supported without any service interruption even during handover procedure.

Figure 7:
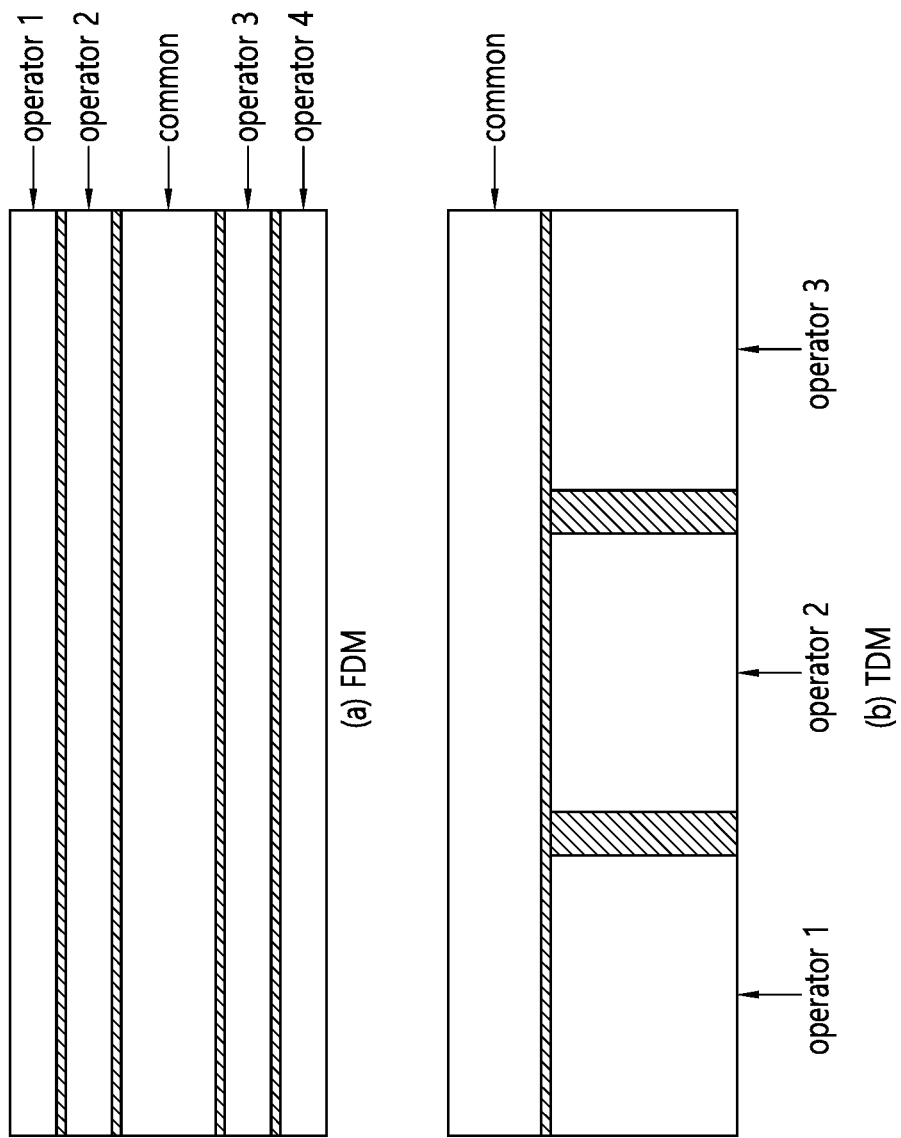
FIG. 7 shows an example of coexistence of multiple operators.

FIG. 7 shows an example of coexistence of multiple operators. Though it is considerable to dedicate a frequency/carrier for the time-critical message, a dedicated frequency may be shared by multiple operators, and different operators may coexist with each other based on frequency division multiplexing (FDM) scheme and/or time division multiplexing (TDM) scheme. Referring to FIG. 7-(a), multiple operators coexist with each other via FDM. That is, frequency/carrier may be divided into multiple bands/channels/carriers, and one or more bands may belong to each operator and may be reserved for common data transmission. Furthermore, one or more bands may be maintained by each operator though the operation can be shared among UEs. Referring to FIG. 7-(b), multiple operators coexist with each other via TDM. That is, frequency/carrier may be divided into multiple time slots, and one or more time slots may belong to each operator. Further, a band reserved for common data transmission and a band belong to each operator may coexist with each other via FDM.

The time-critical message may be handled by allocating dedicate resources for the time-critical message. Overall, at least one of the following options may be considered.

(1) Dedicated frequency/carrier and/or dedicated time may be allocated for the time-critical message. Dedicated frequency/carrier and/or dedicated time may be allocated via predetermined rule, such as specification, or may be broadcasted by each cell. While the time-critical message may be transmitted over the dedicated frequency/carrier or dedicated time, other non-time-critical message may be transmitted over a carrier owned by each operator (i.e. possibly different per public land mobile network (PLMN)).

(2) Out-of-coverage resource may be used for the time-critical message, regardless of in-coverage/out-of-coverage and/or mode/type of D2D communication/D2D discovery. In this case, how to select/perform synchronization to use those resources will be described below in detail.

(3) Separate resource for the time-critical message may be advertised via each cell, which is aligned via coordination. This may assume that the time-critical message is communicated between V-UE and a network entity, i.e. eNB or RSU. This resource may be called as "listening resource pool", which indicates the intention of eNB or RSU to listen on the carrier/frequency for any incoming time-critical message. The listening resource pool will be described below in detail. To determine the timing of the resource, either external synchronization source, such as global positioning system (GPS), may be used, or a reference cell/source may also be indicated by each cell. Or, an offset, which represents the offset between the reference timing and the cell which is advertising the resource, may be given so that a UE can estimate/compute the timing of resource pool based on the timing of the cell.

In general, if multiple resource pools are configured by a cell, it may also include the list of message type or service type which can be supported by the resource pool.

Regardless of which option described above is used, the following issues need to be addressed.

(1) Different synchronization source per resource pool or service type (2) Different discovery/communication type per resource pool or service type That is, two issues are present to support continuous service using direct communication based on resource configured by the network. One issue is that UEs in the proximity may use resources configured by different operators/networks. In this case, depending on the collaboration/cooperation levels among different operators, service continuity with mobility becomes challenging. Another issue is that a UE may switch its serving cell where resources are independently configured by each serving cell, and handover procedure may not allow seamless resource pool switch.

In order to support the time-critical message, service continuity in intra-operator network-controlled discovery/transmission needs to be addressed. Further, mutual communication among UEs, which belong to different operators from each other, also needs to be addressed. Further, handling of overlapping resources among cells belonging to different operators from each other also needs to be addressed. In summary, how to guarantee that the time-critical message can be transmitted efficiently in case of collision needs to be addressed. In the description below, various embodiments of the present invention will be described to solve the problems described above.

The present invention may consider at least one of the following options.

(1) A default or common resource pool, which can be used regardless of the serving cell, may be configured. In other words, the resource pool may be configured rather commonly by the network via coordination. This common resource pool may be explicitly configured/indicated or may be complement of any configured resource pool managed by eNB/RSU. Any time and/or frequency resources not used by the network or resources not managed by any eNB/RSU may be assumed as a common resource pool, which can be used for UE-autonomous V2V communication. In other words, eNB/RSU may claim resource pools for its management. By default, all resources may be assumed to be used for a default/common resource pool, unless a UE detects any resource claimed/configured by the eNB/RSU to be managed. Those configured/claimed resource by eNB/RSU may be used for some transmission/communication between UE and eNB/RSU. Thus, the configured/claimed resource may have higher priority over other V2V communication.

(2) Priority rule or message type restriction on the resource which are overlapped among neighbor cells/inter-operator cells may be configured. For example, if cells are synchronized, the overlapped resource may have higher priority over non-overlapped resources. Further, usage of the overlapped resource may be restricted for, e.g. the time-critical message. If the overlapped resource corresponds to the listening resource pool, the overlapped resource among multiple operators or cells may have higher priority over other resource pools, since more cells will hear the transmission which will have higher probability of forwarding. In this case, time-critical message delivery procedure may be as follows.

1) A V-UE transmit the time-critical message
2) eNB/RSU overhears or listens the time-critical message
3) eNB/RSU forwards the time-critical message via multicast or broadcast transmission.

In other words, V2V communication between UEs may be performed via relay by the network entity, i.e. eNB/RSU (V2I->I2V). The overlapped resource may have different timing. Regardless of the network timing, a UE may use different timing and each UE should be able to perform synchronization to listen to transmission. For this, each UE may transmit a preamble before transmission or a synchronization signal before transmission, which the UE wishes that eNB/RSU with different timing listens to.

(3) Inter-PLMN capable UE/RSU based relaying may be used. That is, some UEs/RSUs which are capable of listening different operator's cells/frequencies may be utilized.

Hereinafter, various use cases according to the present invention are described.

1. Uses case 1: D2D operation between UEs belonging to different cells.

FIG. 8 shows an example of D2D operation between UEs belonging to different cells according to an embodiment of the present invention. Referring to FIG. 8-(a), a V-UE moves from coverage of one cell (i.e. cell A) to coverage of another cell (i.e. cell B). Referring to FIG. 8-(b), cell A and cell B may configure different resource pools which partially overlaps with each other. In case two neighbor cells configure partially overlapping resource pools, there may be some issues to support D2D operation between UEs.

D2D operation between UEs served by different cells may not be feasible. That is, a UE served by cell A and another UE serve by cell B may not be able to communicate with each other effectively. In other words, if resource pools used by UEs are not aligned, those UEs may not be able to communicate with each other or those UEs may not be required to communicate with each other. In terms of reliability, latency, etc., those UEs which are not reachable may not be accounted for. Alternatively, for resource pools which are overlapped, if cells are not synchronized with each other, a UE cannot monitor both resource pools. Particularly, if a UE is transmitting using one resource pool which is partially/fully overlapped with other resource pool, the UE cannot monitor any transmission from other UEs.

Thus, to allow D2D operation between UEs, at least non-overlapped resources should be used. For example, if all resource pools are overlapped as shown in FIG. 8, a UE may request to the network to reconfigure the resource pool to have non-overlapped resource pools. However, if cells are synchronized with each other, the overlapped resource pool may be useful to communicate between UEs belonging to different cells. In that case, the overlapped resource poll may have higher priority. To determine the priority of the overlapped resource pool, one of the following approaches may be considered.

(1) Explicit priority configuration by the serving cell: The serving cell may configure different resource pools with different priorities/usages. For example, if the serving cell is synchronized, the overlapped resource pool may be configured as higher priority resource pool which can be used for the time-critical message. If the serving cell is not synchronized, the overlapped resource pool may be configured as lower priority resource pool, and its usage may be restricted to the time-critical message. Alternatively, the serving cell may indicate whether the neighbor cell is synchronized or not, along with resource pool configuration of a neighbor cell. If the neighbor cell is synchronized, a UE may assume that the overlapped resource pool may be used with higher priority, since there is higher possibility that other neighbor UEs served by different cells can also monitor the same resource pool.

If the overlapped resource pool is rather limited and multiple UEs attempt to use the overlapped resource pool, collision probability may increase. Thus, some type of collision handling may be needed. For example, the overlapped resource pool may be used only via explicit grant, e.g. scheduling assignment, received from the network. In other words, a UE which has the time-critical message may request to the network a grant of resource usage, which may be granted via the explicit grant received from the network. To minimize the latency, the overlapped resource pool granted by the explicit grant may be triggered only when a UE detects congestion. If there are time-critical messages which may be delay-tolerant, a network may configure separate resource pools which are managed only via the explicit grant. In other words, the resource pool may be used only if the network schedules a grant to a given UE. A UE may request explicit grant to utilize the resource pool. The resource pool which can be used by the explicit grant only may be called "grant-based resource pool".

The grant-based resource pool may be used by UEs which are connected to the serving cell which configures the grant-based resource pool. However, one cell may configure the grant-based resource pool for another cell. Thus, a UE may not be connected to the cell which configures the grant-based resource pool. For example, a UE may be connected to primary cell (PCell), and PCell may configure the grant-based resource pool on frequency of secondary cell (SCell). In this case, a UE may not be configured with any SCell. In other words, the grant-based resource pool may belong to one cell, and the grant may be scheduled via another cell Timing of the grant-based resource pool may follow the cell transmitting the grant.

(2) Default resource configuration: A default resource pool which can be shared among neighbor cells may be configured. If cells are not synchronized, a UE may not utilize any network time to utilize the default resource pool. In the default resource pool, a UE may assume type 1 D2D discovery and/or mode 2 D2D communication. In other words, the default resource pool may be used solely based on synchronization from itself or another UE without relying on the network timing. Alternatively, timing from external synchronization source, such as GPS, yay be utilized. Since a UE may also be synchronized with the network and synchronization with the network is more prioritized over synchronization with other UE, if two serving cells are not synchronized with each other, two UEs belonging to different serving cell may not be synchronized with each other. To avoid this situation, a UE may transmit synchronization signal along with cell ID, if it is synchronized with the network. When a UE receives the synchronization signal from another UE with different cell ID from its serving cell or its synchronization source cell, the UE may perform the following procedure.

If the cell ID received from another UE is lower than the cell ID of the synchronization source cell of the UE, the UE may obtain the synchronization from another UE. Otherwise, the UE may not update synchronization source for the default resource configuration. The update of synchronization source may be applied only for the default resource configuration.

If the UE has updated the synchronization source, the may transmit synchronization signals for other UEs. When transmitting synchronization signals, the UE may also transmit the cell ID from another UE (i.e. cell ID which is used for synchronization).

By the above mechanism, the UE may be roughly synchronized with a cell which has the lowest cell ID among neighbor cells.

Alternatively, the preconfigured resource pool, which is preconfigured for out-of-coverage UEs, may be used for the default resource pool. Even though the network configures separate resource pools, a UE may be able to assume that the preconfigured resource pool may be used for shared resource pools among cells/inter-operators. Without knowing information of network synchronization, different synchronization/timings may be used for different resource pools. Even though a UE may know the status of network synchronization, to allow D2D operation with out-of-coverage UEs, different synchronization/timings may be used for the default resource pool.

If the default resource pool is configured, the overlapped resource pool may be used with the same priority to other resource pools. In other words, the priority of resource pool may not be related to whether the resource pool is overlapped or not. In summary, a default resource pool which can be shared among cells may be configured to support service continuity for the time-critical message, and the timing of the default resource pool may be different from the network timing or the serving cell timing. For common timing of the default resource pool, GPS timing, or UE-based timing or RSU-based timing may be used. If RSU-based timing is used, RSU may transmit synchronization signals which will be used for the timing reference for the default resource pool.

2. Uses case 2: D2D operation between UEs belonging to different operators in different frequencies.

It is possible that UEs in proximity are served by different carriers or operators. It is also possible that different operators may utilize different frequencies to perform D2D operation. In such cases, to allow D2D operation between UEs, some type of coordination among operators may be necessary. Similar to the use case 1 described above, common resource pool may be configured. That is, the prefixed resource pool used for out-of-coverage UEs may be configured as default/common resource pool among different operators. In this case, a frequency of the prefixed resource pool may also be configured or pre-configured. If there is a dedicated frequency reserved for D2D operation such as e.g. for safety critical applications, the prefixed resource pool may be configured in the dedicated frequency.

However, the prefixed resource pool may not be usable for UEs out-of-coverage other than some purposes such as safety applications. Thus, it is generally better to allow separate resource configuration of prefixed/preconfigured resource pool which can be used to allow D2D communication/discovery among UEs served by different operators. Though the frequency may be dedicated for D2D operation, as each UE may have to perform D2D operation in different frequency as well, a set of resource pools may be preconfigured/prefixed for this purpose. Alternatively, if the dedicated frequency is available, UEs may perform D2D operation only in the dedicated frequency. In summary, a separate prefixed/preconfigured resource pool may be configured for UEs belonging to different operators. Similar to the default resource pool described in the use case 1 above, synchronization/timing among UEs to utilize the prefixed resource pool may be different from synchronization/timing for other resource pools. Synchronization among UEs for the prefixed resource pool may be performed as described in the use case 1.

Figure 9:
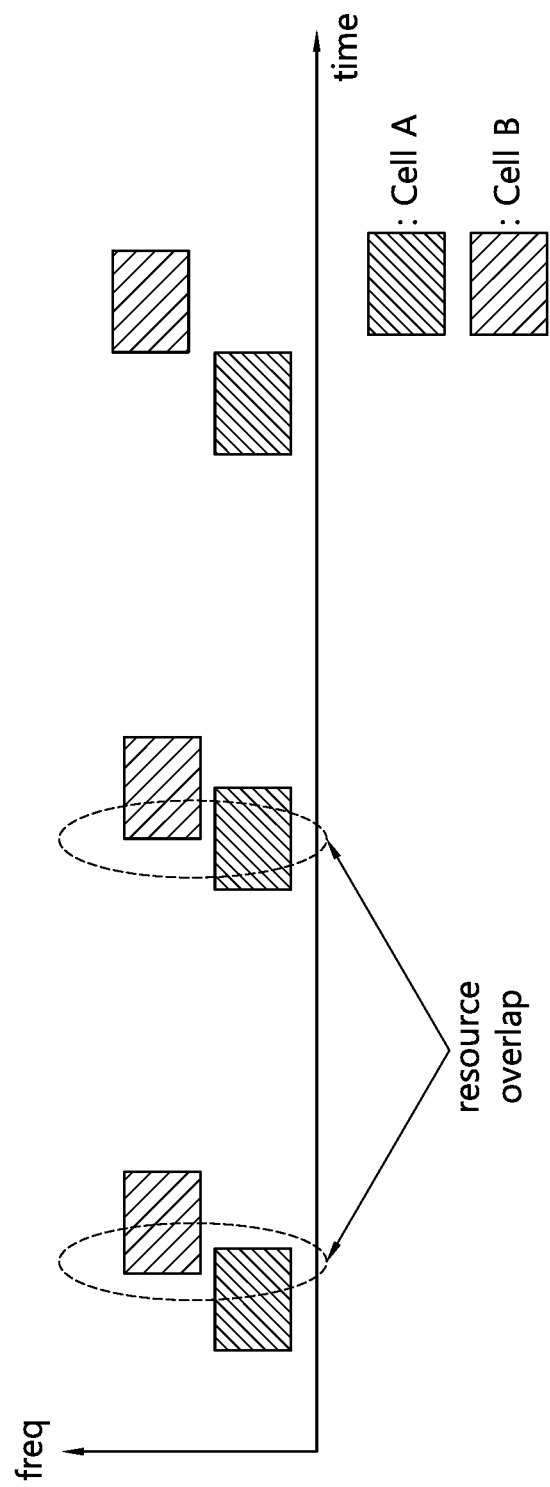
FIG. 9 shows an example of D2D operation between UEs belonging to different operators in different frequencies according to an embodiment of the present invention.

FIG. 9 shows an example of D2D operation between UEs belonging to different operators in different frequencies according to an embodiment of the present invention. Referring to FIG. 9, operator A and operator B use different frequency, respectively. Some resource pools overlap with each other (e.g. in time domain), and separate resource configuration of prefixed/preconfigured resource pool for each operator may be used for D2D communication/discovery among UEs.

When the additional common resource pool is not available, to allow D2D operation between UEs, one of the followings may be considered.

A serving cell may transmit information on the frequency, PLMN, resource pool configuration of another neighbor cell operated by different operator (which may operate in different frequency).

If a serving cell does not transmit the information on the resource pool of neighbor cell, a UE may search the resource pool of neighbor cell via reading physical broadcast channel (PBCH)/system information block (SIB)/etc. The information may be also transmitted to the serving cell so that the serving cell may acquire the resource pool configuration of the neighbor operator.

Once a UE knows the frequency and resource pool configuration of neighbor cell, the UE may create a gap to monitor the resource pool of neighbor cell. The serving cell may explicitly configured the gap configuration. Or, a cell-common gap pattern (discontinuous transmission (DTX)— pattern from the perspective of the serving cell) may also be configured. At the discontinuous reception (DRX)/DTX/gap, a UE may switch to different frequency to monitor the resource pool of another operator. If there are more than one different operators, in each gap, the resource pool of different operators may be monitored. Since it may become challenging to enable reliable transmission/reception as the eNB/RSU does not know when the intended UE may monitor the resource pool (specifically, if the intended UE is served by different operator), some type of network assistance may be necessary for reliable transmission of the time-critical message. Accordingly, the serving cell may periodically broadcast the time-critical message. Alternatively, the serving cell may broadcast a resource pool or a subset of resource pools, which will be used for the time-critical message.

If any network assistance is not assumed, a UE may need to monitor the resource pool of different operators/cells to receive messages transmitted by UEs in different frequency. To allow frequency retuning, at least 0.5 ms frequency retuning latency may be assumed. If resource pool between its own frequency and visiting carrier's frequency collide with each other, a UE may not be able to monitor the resource pool of the visiting carrier.

For this, some type of UE grouping and relaying may be considered. For example, if there are two UEs in the same frequency, two UEs may negotiate or form two groups in which the first group is for monitoring its own frequency and the second group is for monitoring other carrier's frequency. While the second group monitors other carrier's frequency, the first group may monitor transmission/reception in the serving frequency. To allow reliable message transmission/reception, two groups may broadcast/relay received information with each other. That is, the first group may relay messages received in the serving frequency to the second group, and the second group may relay messages received in the other carrier's frequency to the first group. For relaying operation, separate resource pool may be configured. The group may be implicitly formed based on UE ID or explicitly formed via negotiation or formed by network. Particularly, since not many UEs may not have to monitor other carrier's frequency, thus, a few UEs may be selected to monitor other carrier's frequency. However, UEs having data to transmit may not be able to monitor different frequency. Thus, multiple UEs may be assigned to monitor different frequency from the serving frequency. The received data may be transmitted to the network, and the network may relay the data via DL transmission to the UEs as well.

For another example, a network may configure a subset of UEs to monitor different frequency for different PLMN. The network may also configure monitoring time, frequency, etc. The received data by those UEs may be transmitted directly to the eNB, and the eNB may broadcast the received data via multicast session or via broadcast. For another example, carrier aggregation (CA)—capable UEs may claim to monitor different frequencies as well. The UE, which decides to listen to different frequency, may broadcast its intention so that neighbor UEs may not have to listen to different frequency.

The present invention described above may be applied to a carrier which is maintained by one operator. Further, network-driven operation may be performed rather than UE-autonomous D2D operation or V2V operation. Further, different transmission/reception mode for D2D communication/discovery may be used per carrier or per resource pool, regardless of the connection status or UE status form the network perspective. Communication between V-UE and the network entity (i.e. eNB/RSU) may be performed via V2V or V2X dedicated carrier, and the timing may be based on V2X or V2V operation. The operation may be viewed as the operation between V2X or V2V operation and V2I operation sharing the same resource. In that sense, it may be assumed that there is a virtual operator or the network maintaining V2V or V2X operation in a V2X/V2V dedicated carrier/frequency.

The listening resource pool is described in detail. Each operator may listen to V2X/V2X dedicated carrier for the time-critical message. As the eNB may need to perform other operation or listen to other frequency/channel in a V2X/V2V dedicated carrier, the eNB may advertise when to listen to each carrier. Accordingly, the listening resource pool, rather than transmission pool or receiving pool, may be configured for network-assisted D2D operation. A UE may transmit the time-critical message in the listening resource pool, which is overlapped among different operators, so that the reliability of reception by the network entity can be improved. Once the network entity overhears or listens to the time-critical message, the network may forward the time-critical message.

This operation may be performed by RSU-E or RSU-U. As RSU may not be able to listen to all channels at the same time, a UE may utilize the listening resource pool which are overlapped or shared among many RSUs. In other words, the listening resource pool advertised by the eNB/RSU may be used by a UE to deliver the time-critical message so that it can be overheard by the eNB/RSU. This is different from TX resource pool managed or configured by the eNB/RSU in a sense that a UE is free to use any resource, however, the intention of the eNB/RSU is known in prior which can be used to determine the priority among the resource pool. Furthermore, the listening resource pool may also give indication that the eNB/RSU will not transmit in the listening period, which may be also used for other UEs to make scheduling decisions. Overall, the eNB/RSU may advertise its intention of the listening resource pool or listening periodicity per each channel or carrier where the eNB/RSU intends to listen to a specific carrier/channel.

The listening resource pool may be used as a reference for UEs to listen to the time-critical message. For UEs not having any data to transmit may listen to one or multiple listening resource pools configured by the eNB/RSU. In other words, the eNB/RSU may softly reserve resources for the time-critical message which should be shared among many UEs. If high reliability is needed, the listening resource pool configured by the eNB/RSU may be mandated to be listened by other UEs which are not transmitting at a given moment. In that sense, the listening resource pool may indirectly indicate the resource pool usable for safety-critical message. The listening resource pool may be viewed as soft resource pool in a sense that a UE is not restricted to use the listening resource pool only for transmitting the safety-critical message. However, the number of required retransmission may be reduced if the UE uses the listening resource pool as the eNB/RSU will perform forwarding operation.

It may also be considerable to receive any acknowledgement from the network for the transmitted data. In such case, the UE may assume that the data has been received successfully by other UEs as well, since the network is responsible for further forwarding and data transmission. In other words, if a UE uses the listening resource pool configured by the eNB/RSU, the UE may reduce the required number of repetition or retransmission or the UE may expect any acknowledgement from the eNB/RSU. Otherwise, a UE may perform multiple repetition/retransmission to achieve a certain level of reliability.

Figure 10:
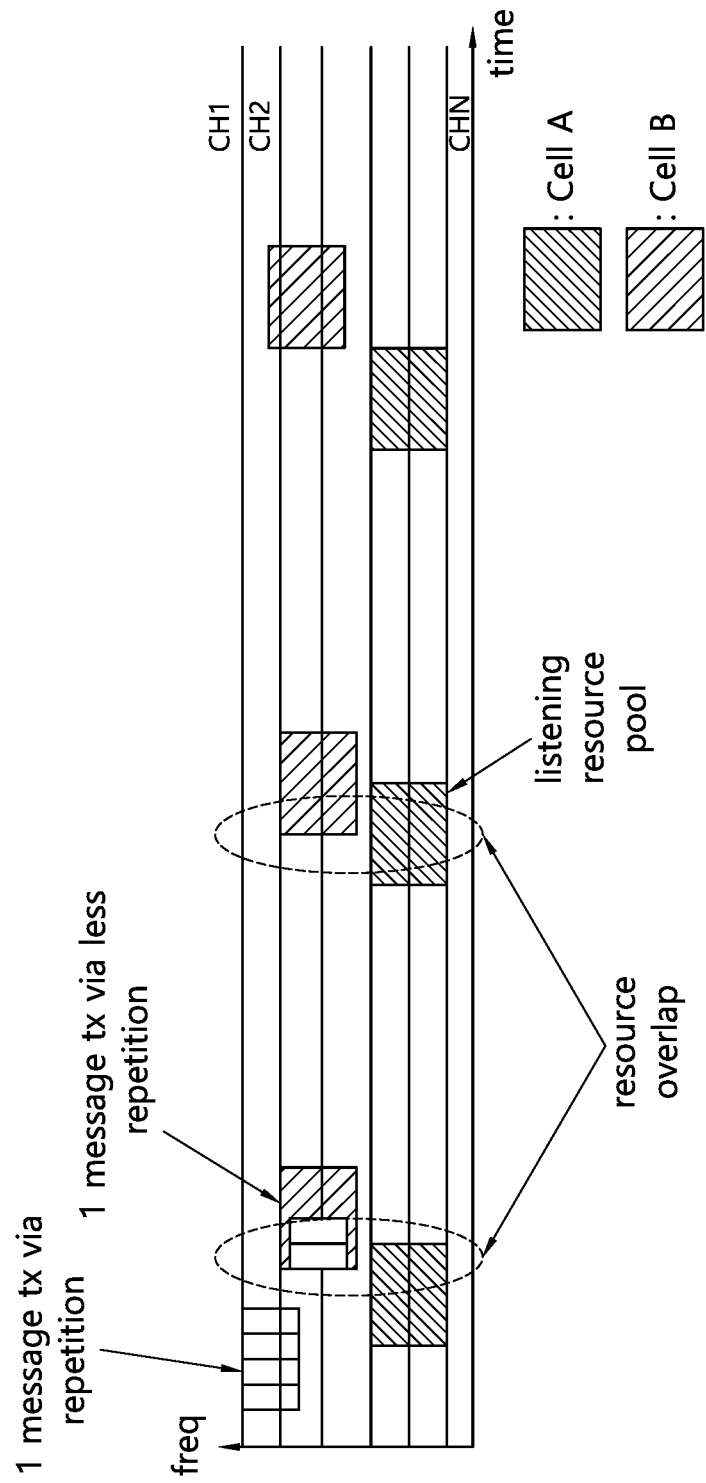
FIG. 10 shows an example a listening resource pool according to an embodiment of the present invention.

FIG. 10 shows an example a listening resource pool according to an embodiment of the present invention. Referring to FIG. 10, the required repetition number outside of the listening resource pool configured by operator B and inside of the listening resource pool configured by operator B may be different from each other.

In summary, the present invention described above proposes the followings:

Grant-based resource pool for the time-critical message to avoid congestion in resource pool configured for the time-critical message: If the network coverage is supported, to deliver the time-critical message in the common resource pool, the network entity (i.e. eNB/RSU) may explicitly transmit the grant so that collision can be minimized. To minimize the collision, cells may coordinate how to use the common resource pool. The grant-based resource pool for the time-critical message may be configured in the V2X dedicated band/carrier/channel by the eNB/RSU, regardless of D2D communication/discovery.

A default resource pool which may be used between handover or between cells with different resource pools/timing information or between different operators A different timing reference on each resource pool depending on its purpose and/or mode/type of resource pool: External timing different from network timing may be used. For example, if GPS timing is available, the GPS timing may be used. Otherwise, UE-based or RSU-based timing may be used.

A different mode/type on each resource pool depending on its purpose: Multiple resource pools for different type/mode may be configured. The configuration may be given from different sources (i.e. eNB/RSU) on the same frequency assuming those sources already coordinated the resource partitioning. For example, more than one out-of-coverage resource pools may be configured by multiple sources.

A different mode/type on a resource pool depending on when it is used (e.g. UE autonomous mode/type in case when a UE needs to communicate with UEs belonging to different cell regardless of configuration)

Figure 11:
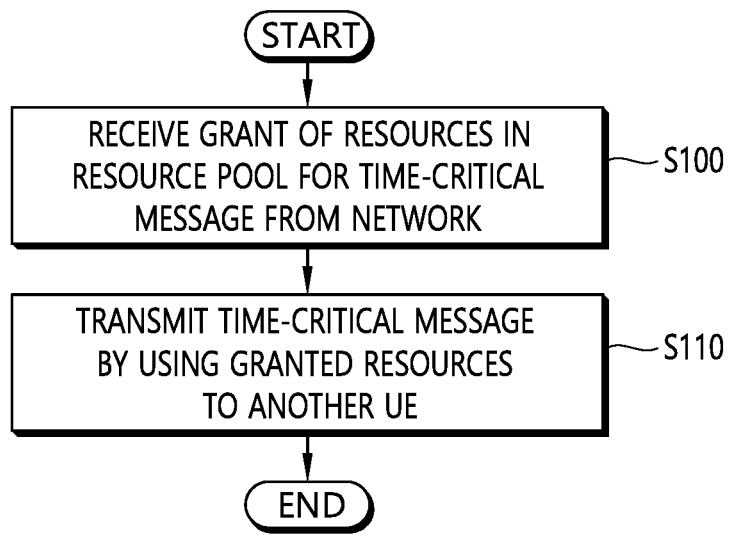
FIG. 11 shows a method for transmitting, by a UE, a time-critical message according to an embodiment of the present invention.

The listening resource pool may be configured/advertised by the eNB/RSU. The listening resource pool may have intention that the network will listen to the listening resource pool so that some important data (i.e. the time-critical message) may be sent for further forwarding or assistance by the eNB/RSU Priority among resource pools overlapped between different cells and/or operators Different repetition number or transmission mechanism between resource pools configured/managed by the eNB/RSU and other UE-autonomous resource pools FIG. 11 shows a method for transmitting, by a UE, a time-critical message according to an embodiment of the present invention. The UE may be a V-UE. The time-critical message may correspond to V2X communication. The present invention described above may be applied to this embodiment.

In step S100, the UE receives a grant of resources in a resource pool for the time-critical message from a network. The UE may request the grant of resources before receiving the grant of resources. The network may correspond to an eNB or RSU for V2X communication.

The resource pool may be a common resource pool which is shared by cells in the network. The common resource pool may be coordinated by the cells. The resource pool may be allocated in a V2X dedicated carrier. The grant of resources may be received via a cell in which the resource pool is allocated. Or, the grant of resources may be received via a first cell, which is different from a second cell in which the resource pool is allocated.

Meanwhile, a timing of the resource pool may be different from a timing of the network. A GPS timing may be used for the timing of the resource pool.

In step S110, the UE transmits the time-critical message by using the granted resources to another UE. The time-critical message may be overheard by the eNB or the RSU in a listening resource pool, and may be forwarded by the eNB or the RSU to another UEs via multicast or broadcast.

Figure 12:
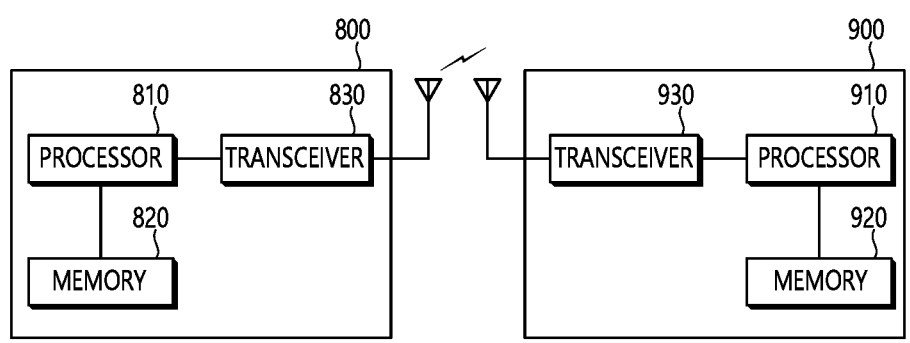
FIG. 12 shows a wireless communication system to implement an embodiment of the present invention.

FIG. 12 shows a wireless communication system to implement an embodiment of the present invention.

An eNB or RSU 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE (i.e. V-UE) 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), a time-critical message in a wireless communication system, the method comprising:
   receiving a grant of resources in a resource pool for the time-critical message from a network; and
   transmitting the time-critical message by using the granted resources to another UE,
   wherein the resource pool is a common resource pool which is shared by cells in the network,
   wherein an overlapped resource by different cells has higher priority over non-overlapped resources for the transmission of the time-critical message,
   wherein the network corresponds to an eNodeB (eNB) or a road side unit (RSU) for a vehicle-to-everything (V2X) communication,
   wherein the time-critical message is overheard by the eNB or the RSU in a listening resource pool in different cells and frequencies,
   wherein the time-critical message is forwarded by the eNB or the RSU to other UEs via multicast or broadcast, and
   wherein, when the UE uses the listening resource pool configured by the eNB or the RSU, the UE reduces a required number of repetitions for the transmission of the time-critical message.

2. The method of claim 1, wherein the common resource pool is coordinated by the cells.

3. The method of claim 1, wherein the resource pool is allocated in a vehicle-to-everything (V2X) dedicated carrier.

4. The method of claim 1, further comprising requesting the grant of resources before receiving the grant of resources.

5. The method of claim 4, wherein the grant of resources is requested only when the UE detects congestion in the resource pool.

6. The method of claim 1, wherein the grant of resources is received via a cell in which the resource pool is allocated.

7. The method of claim 1, wherein the grant of resources is received via a first cell, which is different from a second cell in which the resource pool is allocated.

8. The method of claim 1, wherein a timing of the resource pool is different from a timing of the network.

9. The method of claim 1, wherein a global positioning system (GPS) timing is used for the timing of the resource pool.

10. The method of claim 1, wherein the time-critical message corresponds to V2X communication.

11. A user equipment (UE) in a wireless communication system, the UE comprising:
    a memory;
    a transceiver; and
    a processor, operatively coupled to the memory and the transceiver, that:
    controls the transceiver to receive a grant of resources in a resource pool for the time-critical message from a network, and
    controls the transceiver to transmit the time-critical message by using the granted resources to another UE,
    wherein the resource pool is a common resource pool which is shared by cells in the network,
    wherein an overlapped resource by different cells has higher priority over non-overlapped resources for the transmission of the time-critical message,
    wherein the network corresponds to an eNodeB (eNB) or a road side unit (RSU) for a vehicle-to-everything (V2X) communication,
    wherein the time-critical message is overheard by the eNB or the RSU in a listening resource pool in different cells and frequencies,
    wherein the time-critical message is forwarded by the eNB or the RSU to other UEs via multicast or broadcast, and
    wherein, when the UE uses the listening resource pool configured by the eNB or the RSU, the UE reduces a required number of repetitions for the transmission of the time-critical message.

* * * * *